United States Patent [19]

Farmer

[11] 4,137,243
[45] Jan. 30, 1979

[54] POLYMERIC ANTHRAQUINONE DERIVED COLORANTS

[75] Inventor: Larry B. Farmer, Spartanburg, S.C.

[73] Assignee: Milliken Research Corporation, Spartanburg, S.C.

[21] Appl. No.: 815,486

[22] Filed: Jul. 14, 1977

Related U.S. Application Data

[63] Continuation-in-part of Ser. No. 717,143, Aug. 24, 1976, abandoned.

[51] Int. Cl.² .............................................. C07C 97/24
[52] U.S. Cl. .................................... 260/378; 260/377; 260/379
[58] Field of Search ............... 260/369, 378, 379, 377; 8/1 W, 39 R, 77, 164

[56] References Cited

U.S. PATENT DOCUMENTS

| | | | |
|---|---|---|---|
| 989,602 | 4/1911 | Henle | 260/377 |
| 2,563,144 | 8/1951 | Wilder | 260/379 |
| 2,732,382 | 1/1956 | Minsk et al. | 260/379 |
| 3,157,633 | 11/1964 | Kuhn | 260/200 |
| 3,436,401 | 4/1969 | Pfister et al. | 8/39 R |
| 3,987,026 | 10/1976 | Koller et al. | 260/378 |

Primary Examiner—Allen B. Curtis
Assistant Examiner—Raymond Covington
Attorney, Agent, or Firm—Glen M. Burdick; H. William Petry

[57] ABSTRACT

Polymeric anthraquinone derived colorants having improved light and alkali fastness properties represented by the formula:

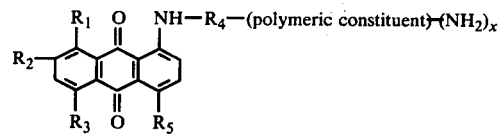

wherein $R_1$ is a member selected from the group consisting of H, OH, a halogen, $NH_2$, $NO_2$ and

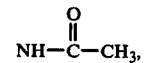

$R_2$ and $R_3$ are members selected from the group consisting of H and OH, $R_4$ is an alkyl moiety containing at least 1 carbon atom, said polymeric constituent is a member of the group consisting of polyalkylene oxides and copolymers thereof in which the alkylene moiety contains from 2 to about 4 carbon atoms, polyalkylene polyamines in which the alkylene moiety contains from 2 to about 4 carbon atoms, polysaccharides, polyamides, and copolymers of vinyl amine and acrylamide, x is an integer of at least 1, and $R_5$ is selected from the group consisting of $OR_6$ or $NHR_7$ and wherein $R_6$ is H, an aryl moiety or an alkyl moiety containing from 1 to about 18 carbon atoms and wherein $R_7$ is an aryl moiety or $R_4$-(polymeric constituent)$(NH_2)_x$ wherein $R_4$, polymeric constituent and x are as previously defined.

4 Claims, No Drawings

POLYMERIC ANTHRAQUINONE DERIVED COLORANTS

This application is a continuation-in-part of my copending application, Ser. No. 717,143, filed Aug. 24, 1976 now abandoned.

This invention relates to novel anthraquinone derived polymeric colorants having improved light and alkali fastness properties and to methods for their preparation. In one aspect it relates to anthraquinone derived polymeric colorants in which the fugitivity properties of said colorants can readily be varied.

Polymeric colorants, such as fugitive tints, are often used to color code textiles during production and/or finishing operations to identify certain synthetic or natural fibers. For example, the fibers may be tinted during the spinning into yarns and their utilization in knitting or weaving operations to ensure that undersirable fibers or yarns are not present. Such tints are then removed during one of the last finishing operations prior to sale. To be acceptable, a fugitive tint should be capable of being removed easily, even after exposure to extreme conditions which might be encountered during the production and finishing of the textile. Also, the tint should have a high degree of fugitivity from a wide variety of textile fibers. In addition, it is essential that the tints have good color stability to minimize fading during exposure to heat and/or light, conditions which may be encountered during processing of the tinted fibers into the final product.

Fugitive tints are generally classified as water fugitive or solvent fugitive. For example, dyestuff radicals containing one or more polyethyleneoxy groups is generally considered to be a water fugitive tint whereas one containing one or more polypropyleneoxy groups is considered to be solvent fugitive. The particular choice of tints and their fugitivity properties depend largely upon the finishing operations of the fiber.

Fugitive tints which have achieved wide acceptance are the polyethylene oxide tints described in U.S. Pat. No. 3,157,633. Such tints are a combination of a dyestuff radical and one or more polyethyleneoxy groups. Dyestuff radicals disclosed in the patent include azos and anthraquinones. A typical method for producing such tints involves the formation of a para-nitroso derivative of a polyethyleneoxy aromatic nitro compound by treatment with sodium nitrite at sub-ambient temperature and at a strongly acid pH. The nitroso derivative is reduced to the para-amine derivative with a combination of a metal and acid, e.g., zinc and hydrochloric acid. The metal is then filtered from the solution and the amine derived is diazotized at a sub-ambient temperature using additional sodium nitrite. The diazonium salt is then coupled with an aromatic hydroxy compound at a highly alkaline pH.

Colorants are also incorporated into detergent compositions or other laundering aids to color same. However, when incorporating a colorant into a detergent composition, it is necessary that the colorant have suitable alkali fastness properties so as to not fade or lose its color in the strongly alkaline conditions of the detergent composition. However, such compound must not only be alkali fast, but must be water fugitive so as to not color the clothes and/or fabrics being washed with such a detergent composition.

Thus, new and novel colorant compositions which can be employed as fugitive tints and/or colorants for detergent compositions or other laundry additives are constantly being sought. Further, such compositions must be light and alkali fast while providing the desired fugitivity properties. Further, it would be highly desirable to provide a class of colorants having a generic dyestuff radical in which the fugitivity properties could be easily varied depending upon the desired use of the colorant.

Furthermore, rapid and efficient exhausting colorants for certain paper products, such as bathroom tissue and paper toweling, where the use of mordants cannot be used to assist in uptake of colorant onto the fiber surface are constantly being sought. Thus, it would be highly desirable to provide a class of colorants having a generic dyestuff radical in which exhaustive properties (or non-fugitive properties) toward paper could be easily obtained.

It is therefore an object of this invention to provide a colorant having improved light and alkali fastness properties.

It is another object of this invention to provide a colorant having a generic dyestuff radical wherein the fugitivity properties of the resultant colorants can be varied.

Another object of the invention is to produce a colorant which can readily be incorporated into a detergent composition which is alkali fast while maintaining the desired fugitivity properties.

These and other objects of the invention will become apparent from the following description.

The novel colorants of the present invention are anthraquinone derived polymeric colorants having the general formula:

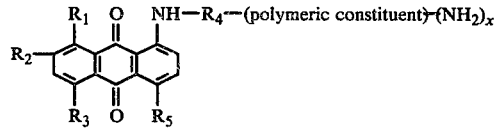

wherein $R_1$ is a member selected from the group consisting of H, OH, a halogen, $NH_2$, $NO_2$ and

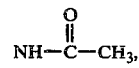

$R_2$ and $R_3$ are members selected from the group consisting of H and OH, $R_4$ is an alkyl moiety containing at least 1 carbon atom, said polymeric constituent is a member of the group consisting of polyalkylene oxides and copolymers thereof in which the alkylene moiety contains from 2 to about 4 carbon atoms, polyalkylene polyamines in which the alkylene moiety contains from 2 to about 4 carbon atoms, polysaccharides, polyamides, and copolymers of vinyl amine and acrylamide, x is an integer of at least 1, and $R_5$ is selected from the group consisting of $OR_6$ or $NHR_7$ wherein $R_6$ is H, an aryl moiety or an alkyl moiety containing from 1 to about 18 carbon atoms and wherein $R_7$ is an aryl moiety or $R_4$-(polymeric constituent)-$(NH_2)_x$ wherein $R_4$, polymeric constituent and x are as previously defined.

The fugitivity properties of the beforedescribed anthraquinone derived polymeric colorants can be varied depending upon the polymeric constituents employed in the preparation of such colorants. For example, if the polymeric constituents is a low molecular weight polyethylene oxide, the resulting colorant will be water fugitive. However, if the polymeric constituent is a low molecular weight polypropylene oxide the resultant colorant will be non-polar organic solvent fugitive. Furthermore, if the colorant is provided with a mixture of a low molecular weight polyethylene oxide and a low molecular weight polypropylene oxide, or a copolymer of ethylene oxide and propylene oxide, then the fugitivity properties of the resulting colorant can be both water soluble and non-polar organic solvent soluble.

On the other hand, if it is desired to provide selected substantitivity of the colorant for a certain substrate, the dyestuff radical can be condensed with a polymer which confers upon the colorant the desired selected substantitivity. For example, if a polyethylene polyamine or an amine-containing polyamide is condensed with the anthraquinone radical, the resulting colorant is selectively substantive to paper.

Thus, it is readily apparent that one can produce a colorant having the desired fugitivity properties depending upon the particular polymeric constituent employed to produce the anthraquinone derived polymeric colorants of the subject invention. The anthraquinone derived polymeric colorants of the invention have an unexpectedly high degree of light fastness and alkali fastness regardless of the particular fugitivity property desired.

In the above compounds, any suitable polymeric resin can be employed as the polymeric constituent, providing the resin is capable of undergoing reaction to provide primary amino groups on the polymeric constituent for subsequent coupling of the polymer constituent to the anthraquinone radical. Thus the polymeric constituent as set forth in the above compounds can be any such suitable polymeric constituent capable of the desired coupling reaction and the particular selection of the polymeric constituent will depend largely upon the desired properties of the colorant, e.g., whether it is desirable that such colorants should be water fugitive and/or non-polar organic solvent fugitive, or substantive. Further, it should be noted that the polymeric constituents in the beforementioned compounds represented by the above-identified formula can be similar or different again the particular selection being dependent to a large extent upon the properties desired in the polymeric colorant. For example, the polymeric constituent employed can be polyalkylene oxides and co-polymers thereof in which the alkylene moiety contains from 2 to about 4 carbon atoms, polyalkyl polyamines in which the alkyl moiety contains from 2 to about 4 carbon atoms, aminated polysaccarides, polyamides, and co-polymers of vinyl amine and acrylamide. The molecular weight of such polymeric resins can vary widely but will generally be up to about 6,000. Typical examples of such polymeric constituents and co-polymers which can be employed as the polymeric constituents of the novel anthraquinone derived polymeric colorants of the present invention are polyethylene oxide, polypropylene oxide, polybutylene oxide, co-polymers of ethylene oxide and propylene oxide, co-polymers of ethylene oxide and butylene oxide, starch, polyvinyl alcohol, co-polymers of acrylamide and vinylamine, co-polymers of vinyl alcohol and vinyl acetate, polyvinyl chloride, co-polymers of vinyl chloride and vinyl acetate, polyamides, polyesters, polyalkylene-polyamines, and the like.

In the before-mentioned anthraquinone derived polymeric colorants $R_5$ can be $OR_6$ wherein $R_6$ is H, an aryl moiety or an alkyl moiety containing from 1 to about 18 carbon atoms or, $R_5$ can be $NHR_7$ wherein $R_7$ is an aryl moiety or $R_4$ - (polymeric constituent)—$(NH_2)_x$ where $R_4$, polymeric constituent and x are as previously defined. Thus, $R_6$ and $R_7$ can be aryl moieties having a carbocylic nucleus containing from 6 to 10 carbon atoms in the ring, such as phenyl, toluyl, napthyl and the like. Further, $R_6$ can be an alkyl moiety containing from 1 to about 18 carbon atoms, such as methyl, ethyl, propyl, butyl, 2-ethylhexyl, dodecyl, octadecyl and the like.

The anthraquinone derived polymeric colorants defined above are light and alkali fast compositions which can be employed effectively as fugitive colorants on polyester and other synthetic fibers, cellulosic fibers, and blends containing same or substantive, depending upon the particular molecular configuration of the colorant. Further, because of the improved alkali fastness of such compositions and the case with which the molecular configuration of such compositions can be varied, certain of such compositions can be employed as colorants in detergent compositions without adversely effecting or depositing onto the surface of the clothes or fabrics being contacted with such detergents; whereas others can be employed as bluing agents wherein deposition of substantitivity is desirable.

The compounds of the present invention are typically prepared by the following series of reaction:

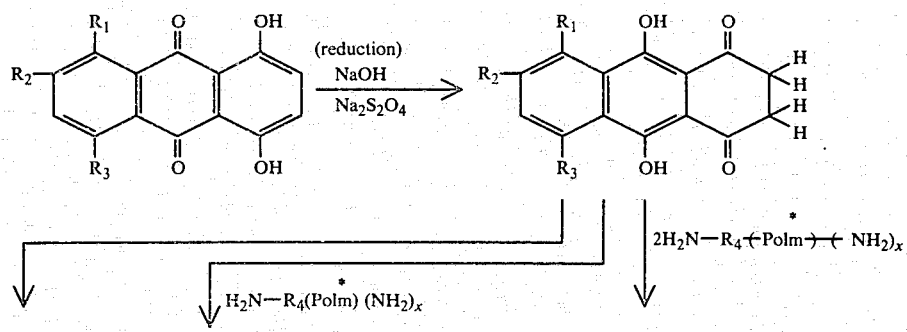

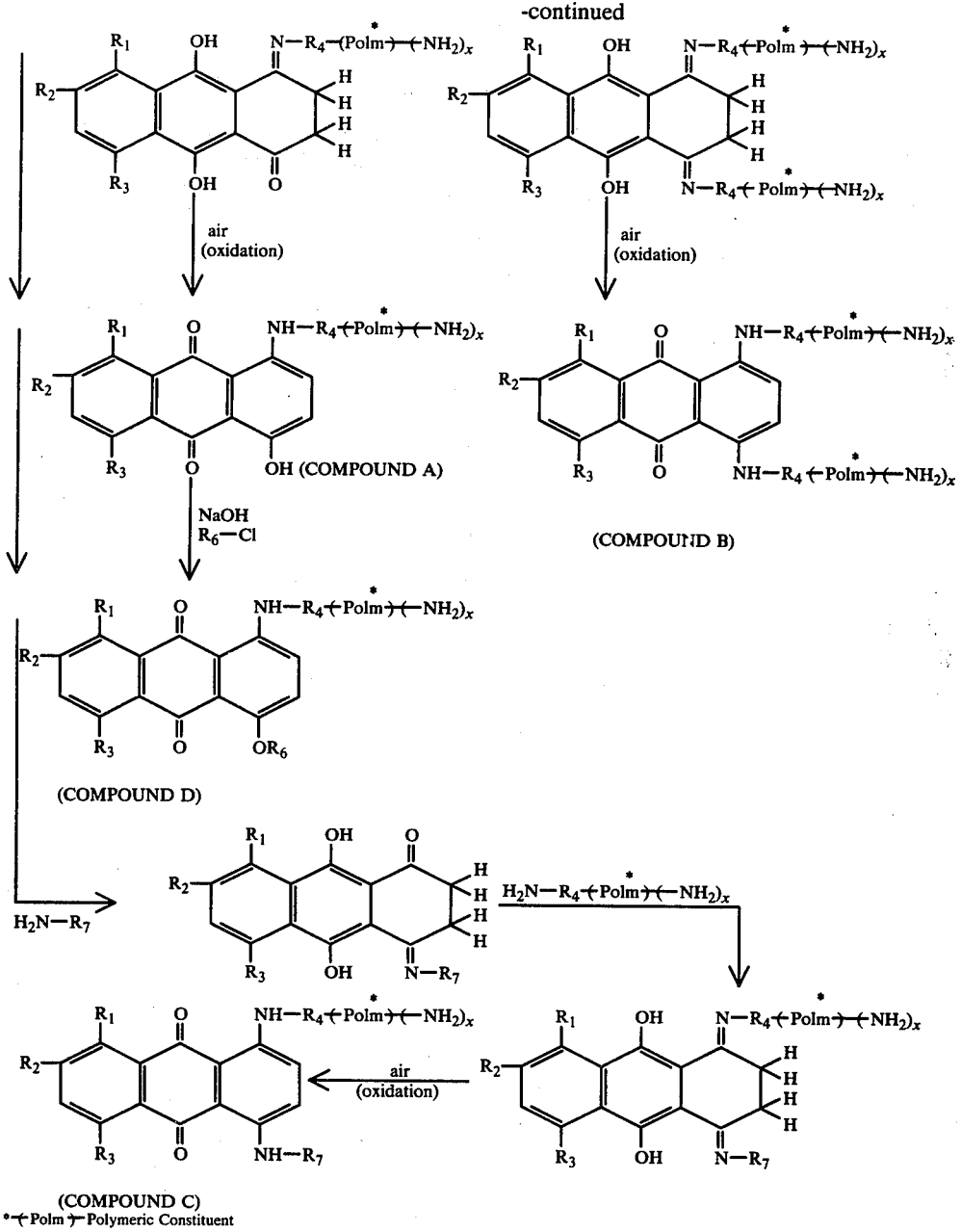

(COMPOUND C)

* ─(Polm)─ Polymeric Constituent wherein $R_1$ is a member selected from the group consisting of H, OH, halogen, $NH_2$ and $$NH-\overset{\overset{O}{\|}}{C}-CH_3,$$

and $R_2$ and $R_3$ are members selected from the group consisting of H and OH.

In the illustrative reactions depicted, $R_4$ is an alkyl moiety containing at least one carbon atom and $R_5$ is OH in compound A, NH - $R_4$-(polymeric constituent)-$(NH_2)_x$ in compound B, NH - $R_7$ in compound C and $OR_6$ in compound D. It should be noted that the polymeric constituent of compound B can be the same polymeric constituent or can be different polymeric constituents. Further, if one desires to produce compound B, the amount of polymeric amine employed must be at least 1 equivalent of the intermediate reduction product whereas if one desires to produce a compound A or C, the amount of polymeric amine employed is about ½ equivalent amount. In each instance, the condensation reaction between leucoquinizarin or the leucoquinizarin substituted derivatives is carried out at a pH level of at least about 4, at atmospheric pressures and at a temperature in the range of from about 35° C. to about 135° C.

Further, any excess of amino groups remaining after the coupling reaction may be converted, following oxidation, to less reactive groups to prevent subsequent unwanted reactions. For example, the excess amino groups may be converted to amido groups by reaction with acetic anhydride. The before-mentioned conversion has been found desirable in the preparation of anthraquinone derived polymeric colorants for use as bluing agents.

When preparing an anthraquinone derived polymeric colorant for use as a bluing agent or colorant additive for laundry detergents, especially desirable results have been obtained wherein the polymeric colorants are produced by the condensation of primary-amine containing polymers of a relatively hydrophobic nature with leucoquinizarin or its derivatives. Especially desirable results have been obtained wherein the anthraquinone derived polymeric colorant is derived by condensing a bis-(2-amino-propyl) ether of a polypropylene glycol with leucoquinizarin and oxidizing the reaction product to the desired colorant. While the particular bis-(2-amino-propyl) ether employed can vary widely, preferably such components have a molecular weight in the range of from about 200 to about 4,000.

The following examples are given to illustrate the preparation of certain compounds within the generic formula of the anthraquinone derived polymeric colorants of the present invention. Such compounds, when experimentally tested, exhibited improved light and alkali fastness properties. It should be understood that the following examples are given for purposes of illustration and should not be considered as limiting the spirit or scope of the invention.

EXAMPLE 1

1,000 Grams (0.5 mole) of a polyoxyethylenediamine having a molecular weight of 2,000 was placed in a reaction vessel and heated to 75° C. The heating of the polyoxyethylenediamine was carried out in a nitrogen atmosphere. 60 Grams (0.25 mole) of finely crushed leucoquinizarin was then added to the heated polyoxyethylenediamine in small increments with constant stirring. The resulting mixture was then heated and stirred for about 4.5 hours. The resulting leuco product was then oxidized by bubbling air into the reaction mixture. The resulting oxidation product was a polymeric water soluble blue fugitive tint possessing good light and alkali fastness properties and having the formula:

ing, in addition to light and alkali fastness properties, non-staining properties. Excess amino groups were then converted to amido groups by reaction with 6.3 grams of acetic anhydride for each 100 grams of product, without detriment to the finally converted product from the standpoint of its usefulness as a laundry bluing agent and of its good light and alkali fastness properties. The product had the general formula:

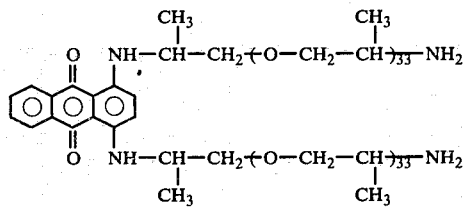

EXAMPLE III 46.6 Grams (0.2 mole) of pentaethylenhexamine was admixed with 100 grams of cellosolve in a reaction vessel. Thereafter, 12.0 grams (0.05 mole) of leucoquinizarin was slowly added to the pentaethylenehexamine-cellosolve mixture. The resultant mixture was then heated, while maintaining agitation to a temperature of from about 85 to 90° C. for 2 hours to allow the condensation reaction, and the oxidation reaction to occur and thus produce an oxidation product. The reaction mixture contained the oxidation product, a blue polymeric dye, and unreacted cellosolve and pentaethylenehexamine. The blue polymeric dye so produced is fugitive from synthetic fibers, whereas the acid salts of the blue polymeric dye exhaust rapidly onto the surface of paper fibers. The blue polymeric dye had the general formula

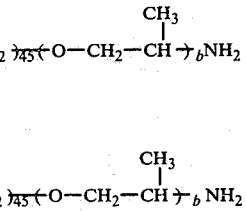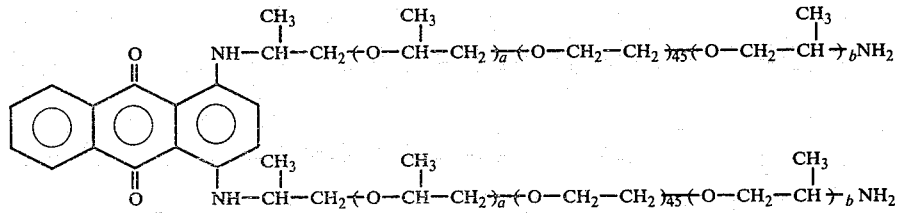

where a and b = 3.5 (average).

EXAMPLE II 12.8 Grams of quinizarin, 38.7 grams of water and 4.2 grams of a 50% aqueous solution of sodium hydroxide were admixed in a reaction vessel. Thereafter, while agitating the mixture, an aqueous solution formed by dissolving 10.6 grams of sodium hydrosulfite in 42.3 grams of water was added to the mixture. Stirring was continued while 211.5 grams of a polyoxypropylenediamine having a molecular weight of 2,000 was added to the aqueous mixture. The resulting mixture was then heated, with constant stirring under a nitrogen atmosphere, to a temperature of 90° C. and maintained at said temperature for 4.5 hours. The resulting leuco product was then oxidized by bubbling air into the reaction mixture which had been allowed to cool to 70° C. The resulting oxidation product was a water insoluble polymeric tint useful as a laundry bluing agent and possess-

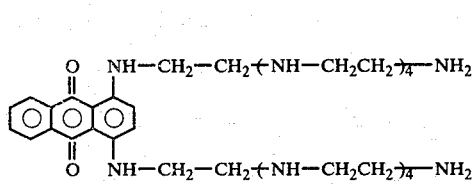

EXAMPLE IV

The procedure of Example II was repeated except that the amine-terminated polymer of Example II was replaced by 210 grams (0.11 amine equivalents of an amine appended starch having an amine molar equivalent of 1900 grams. The resulting oxidation product was a blue polymeric tint having improved light and alkali fast properties. Further, the polymeric tint was a fugitive tint for textile fibers. The tint had the general formula:

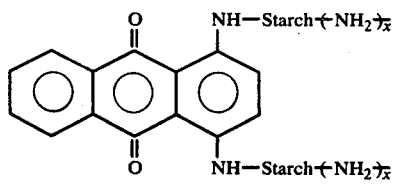

EXAMPLE V

The procedure of Example II was again repeated except that the amine-terminated polymer of Example II was replaced by 211.5 grams of an amine appended polyacrylamide having an amine molar equivalency of about 1,000 grams/equivalent. (The amine appended polyacrylamide was obtained by Hoffman rearrangement of a portion of the appended amido groups by action of hypochlorite).

The resulting oxidation product was a blue water-soluble colorant useful as a light and alkali stable fugitive tint.

EXAMPLE VI

The procedure of Example III was repeated except that the pentaethylenehexamine of Example III was replaced with 28.5 grams (0.05 molar equivalents) of an amine-appended polyamide resin, having a primary amine molar equivalency of 570 grams/equivalent, such compound being sold under the trademark "versamid" 125 by General Mills.

The resulting oxidation product was a polymeric tint which, in its acid salt form, is a rapidly exhausting paper colorant having improved light and alkali fast properties.

Having thus described the invention, I claim:

1. Novel polymeric anthraquinone dervied colorants having improved light and alkali fastness properties represented by the formula

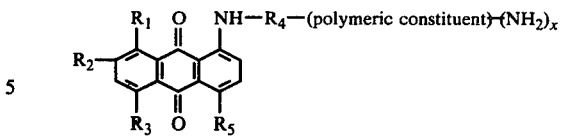

wherein $R_1$ is a member selected from the group consisting of H, OH, a halogen, $NH_2$, $NO_2$ and $$NH-\overset{\overset{O}{\|}}{C}-CH_3,$$

$R_2$ and $R_3$ are members selected from the group consisting of H and OH, $R_4$ is an alkyl moiety containing at least 1 carbon atom, said polymeric constituent is a member of the group consisting of polypropylene oxide, copolymers of polyethylene oxide and polypropylene oxide and mixtures of polyethylene oxide and polypropylene oxide, polyalkylene polyamines in which the alkylene moiety contains from 2 to about 4 carbon atoms, polysaccharides, polyamides, and copolymers of vinyl amine and acrylamide, said polymeric constituent being further characterized as having a molecular weight of up to about 6,000, x is an integer of at least 1, and $R_5$ is selected from the group consisting of $OR_6$ wherein $R_6$ is H, an aryl moiety or an alkyl moiety containing from 1 to about 18 carbon atoms or $NHR_7$ wherein $R_7$ is an aryl moiety or $R_4$-(polymeric constituent)-$(NH_2)_x$ wherein $R_4$, polymeric constituent and x are as previously defined.

2. The polymeric colorant of claim 1 wherein $R_1$, $R_2$ and $R_3$ are H and $R_5$ is NH-$R_4$-(polymeric constituent)-$(NH_2)_x$ wherein $R_4$, polymeric constituent and x are as previously defined.

3. The polymeric colorant of claim 1 wherein said polymeric constituent is polypropylene oxide.

4. The polymeric colorant of claim 2 wherein said polymeric constituent is polypropylene oxide.

* * * * *